United States Patent
Petesch et al.

(10) Patent No.: US 6,886,350 B2
(45) Date of Patent: May 3, 2005

(54) METHOD OF PROVIDING TEMPERATURE CONTROLLED AIR AND AN APPARATUS USABLE FOR THIS

(75) Inventors: Jean-Claude Petesch, Kehlen (LU); Hartmut E Van Hauten, Mainz (DE)

(73) Assignee: Delphi Technologies, Inc., Troy, MI (US)

(*) Notice: Subject to any disclaimer, the term of this patent is extended or adjusted under 35 U.S.C. 154(b) by 107 days.

(21) Appl. No.: 10/428,329

(22) Filed: May 2, 2003

(65) Prior Publication Data

US 2004/0007007 A1 Jan. 15, 2004

(30) Foreign Application Priority Data

Jun. 4, 2002 (DE) .......................... 102 24 763

(51) Int. Cl.⁷ .............................................. F25D 17/06
(52) U.S. Cl. .............................. 62/97; 62/244; 165/42; 165/43
(58) Field of Search .......................... 62/244, 411, 97; 165/43, 42

(56) References Cited

U.S. PATENT DOCUMENTS

| | | | |
|---|---|---|---|
| 4,482,009 A | 11/1984 | Nishimura et al. | 165/41 |
| 4,665,971 A | 5/1987 | Sakurai | 165/22 |
| 4,759,269 A * | 7/1988 | Brown et al. | 454/75 |
| 4,940,083 A * | 7/1990 | Takenaka et al. | 165/42 |
| 5,309,731 A * | 5/1994 | Nonoyama et al. | 62/244 |
| 5,901,572 A * | 5/1999 | Peiffer et al. | 62/480 |
| 6,059,018 A * | 5/2000 | Yoshinori et al. | 165/42 |
| 6,206,092 B1 * | 3/2001 | Beck et al. | 165/203 |
| 6,332,330 B1 * | 12/2001 | Loup et al. | 62/244 |
| 6,368,207 B1 | 4/2002 | McLaughlin et al. | |
| 6,427,770 B2 * | 8/2002 | Beck et al. | 165/203 |
| 6,547,152 B1 | 4/2003 | Pawlak, III | |

FOREIGN PATENT DOCUMENTS

| | | |
|---|---|---|
| DE | 10014203 | 10/2000 |
| EP | 000427282 A1 * | 5/1991 |
| EP | 0733502 | 9/1996 |

* cited by examiner

Primary Examiner—William Doerrler
Assistant Examiner—Mohammad M. Ali
(74) Attorney, Agent, or Firm—Patrick M. Griffin

(57) ABSTRACT

In a method of making available temperature controlled air for a first region and a second region in a vehicle, a cold air flow and a hot air flow are generated. At least one first cold air part flow and one first hot air part flow respectively are formed from the cold air flow and from the hot air flow and the first cold air part flow and the first hot air part flow are mixed to form a first temperature controlled part flow for the first region. Furthermore at least one second cold air part flow and one second hot air part flow respectively are formed from the cold air flow and the hot air flow and the second cold air part flow and the second hot air part flow are transported separately by means of an auxiliary blower and are mixed downstream of the auxiliary blower to form a second temperature controlled part flow for the second region.

13 Claims, 1 Drawing Sheet

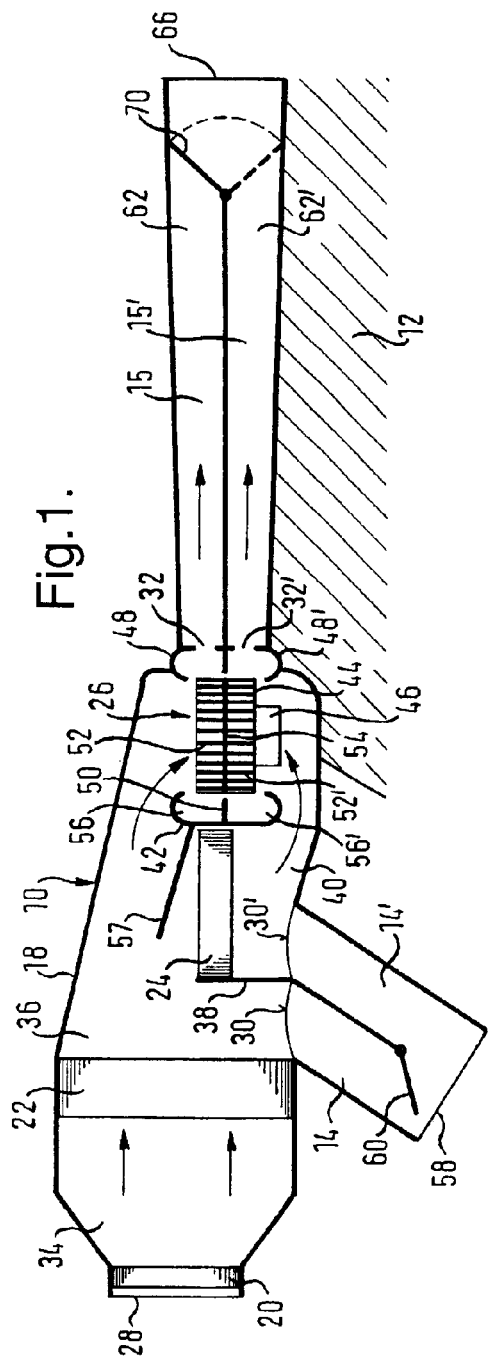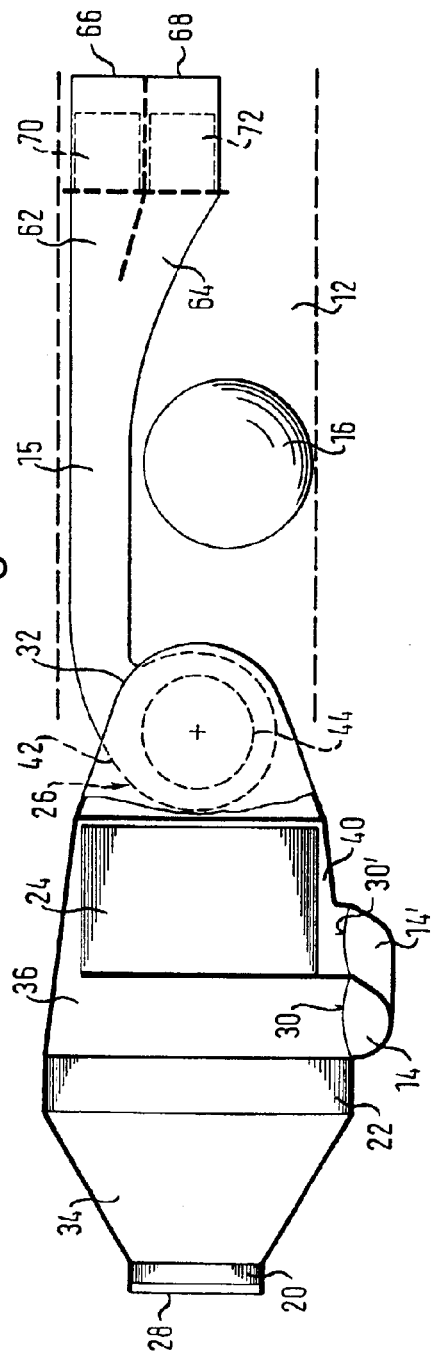

METHOD OF PROVIDING TEMPERATURE CONTROLLED AIR AND AN APPARATUS USABLE FOR THIS

TECHNICAL FIELD

The present invention relates to a method of providing temperature controlled air for a first and a second region in a vehicle as well as to a supply apparatus to make available cold air and hot air for a vehicle air conditioning system.

BACKGROUND OF THE INVENTION

In many vehicles, an air conditioning system is provided to increase comfort by means of which an interior space of a passenger compartment of the vehicle can be air conditioned by supplying suitably temperature controlled air. For this purpose, the vehicle air conditioning system has a supply apparatus to make available cold air and hot air. Cold air flows and hot air flows made available by the supply apparatus are mixed to form a corresponding flow of temperature controlled air in accordance with a predetermined desired temperature and supplied to the passenger compartment.

To increase the comfort, it is desirable for different zones of the passenger compartment to be individually temperature controlled so that, for example, occupants with different heat or cold sensitivity can respectively set a temperature pleasant for them in the zone in which they are located. To achieve this, a multi-zone supply module can be provided for a multi-zone operation, for example, in which valves are provided for each zone to be temperature controlled in order to set a strength and a temperature of the air flow for the corresponding zone. Such multi-zone supply modules are, however, very complex and/or expensive. This is in particular due to the fact that a higher pressure has to be made available to achieve a desired air flow for zones which are located at a larger distance from such a multi-zone supply module installed as a rule in the front region of the vehicle than for zones disposed more closely to the multi-zone supply module so that corresponding measures have to be taken to make the pressure available.

Another possibility to solve the problem consists of making available one supply module to make available cold air and hot air for the front region and a further supply module to make available cold air and hot air for the backseat area. The technical complexity associated with this and the cost associated with this are, however, not tolerable for most application areas.

SUMMARY OF THE INVENTION

It is therefore the object underlying the present invention to make available a method to make available temperature controlled air for a first region and a second region in a vehicle which can be carried out with simple means as well as to provide a suitable simple supply apparatus to carry out the method to make available cold air and hot air.

The object is satisfied by a method to make available temperature controlled air for a first region and a second region in a vehicle having the features of claim 1.

The method in accordance with the invention provides that, for the making available of temperature controlled air for a first region and for a second region in a vehicle, a cold air flow and a hot air flow are produced, at least one respective cold air part flow and one respective hot air part flow is formed from the cold air flow and the hot air flow and the first cold air part flow and the first hot air part flow are mixed to form a first temperature controlled part flow for the first region; and that at least one respective second cold air part flow and one respective hot air part flow is formed from the cold air flow and from the hot air flow, the second cold air part flow and the second hot air part flow are transported separately by means of an auxiliary blower and are mixed downstream of the auxiliary blower to form a second temperature controlled part flow for the second region.

The object is furthermore satisfied by a supply apparatus to make available cold air and hot air for a vehicle air conditioning system having the features of claim 4 which can be used to carry out the method in accordance with the invention.

The supply apparatus in accordance with the invention to make available cold air and hot air for a vehicle air conditioning system includes a cold air source and a hot air source by means of which a cold air flow and a hot air flow can be generated and which has a first cold air outlet for cold air to be made available and a first hot air outlet for hot air to be made available and an auxiliary blower which has a cold air inlet connected to the cold air source and to the hot air source for the supply of cold air and a hot air inlet connected to the cold air source and to the hot air source for the supply of hot air as well as a second cold air outlet and a second hot air outlet and by means of which the air flows supplied to the inlets of the auxiliary blower can be supplied separately to the corresponding second outlets to discharge cold air or hot air to be made available.

In accordance with the invention, a respective first cold air part flow and hot air part flow and a respective second cold air part flow and hot air part flow are therefore formed from a cold air flow and a hot air flow, for which purpose, with the supply device in accordance with the invention, a corresponding cold air source and hot air source is provided which has a first cold air outlet for the first cold air part flow and a first hot air outlet for the first hot air part flow.

The cold air source and hot air source is connected to the auxiliary blower to make available the second cold air part flow or hot air part flow respectively.

While the first cold air part flow and the first hot air part flow are mixed to form a first temperature controlled part flow for the first region without any further transport by the auxiliary blower, the second cold air part flow and the second hot air part flow are transported separately by means of the auxiliary blower and are mixed downstream of the auxiliary blower to form a second temperature controlled part flow for the second region. In the context of the invention, a separate transport of cold air part flows and hot air part flows is also to be understood such that slight mixings of the cold air flows and hot air flows which are caused by the construction of the auxiliary blower and are supplied to the auxiliary blower are possible to a low degree, preferably less than 10%.

The auxiliary blower of the supply apparatus in accordance with the invention has, for this purpose, the cold air inlet connected to the cold air source and to the hot air source and the hot air inlet connected to the cold air source and to the hot air source for the supply of hot air. Cold air supplied to the cold air inlet can then be supplied to the second cold air outlet of the auxiliary blower while increasing the pressure. The second hot air part flow supplied to the hot air inlet can accordingly be supplied to the second hot air outlet while increasing the pressure.

Cold air part flows and hot air flows respectively can thus be made available separately by the supply apparatus in accordance with the invention at its outlets for the second region, with the pressure or mass flow of said cold air part flows and hot air part flows respectively being adjustable with respect to the pressure or mass flow of the cold air part flows and the hot air part flows for the first region. Pressure losses occurring on the supply to the second region can in particular be compensated by means of the auxiliary blower.

The second region can be individually temperature controlled by the separate transport or pressure increase of the second cold air part flow and of the second hot air part flow without a second cold air source or hot air source having to be provided for this region or without a complex multi-zone supply module having to be made available.

At the same time, the two regions of the vehicle can be supplied equally well with temperature controlled air by the use of the auxiliary blower.

Further developments and preferred embodiments of the invention are described in the description, in the drawings and in the claims.

The auxiliary blower can generally have two separately driven part blowers of which one is associated with the second cold air part flow and the other is associated with the hot air part flow. Such an auxiliary blower is, however, complex in construction since two drives are required. It is therefore preferred with the supply apparatus in accordance with the invention for the auxiliary blower to include two blower wheels which are driven jointly by one drive device. The drive device can in particular be an electrical motor, preferably an electrical motor with electrically or electronically drivable speed. A respective one of the blow wheels then serves for the transport of a cold air flow or of a hot air flow respectively.

The two blower wheels can generally be arranged in two chambers separated from one another and can be driven by a common shaft such that, with a sufficiently good sealing of a through-passage of the shaft by at least one wall separating the two chambers, the mixing between cold air transported by the one blower wheel and hot air supplied by the other blower wheel can be minimized. However, such a design is too complex for many applications. This is in particular the case when the blower wheels are to be fitted to the shaft individually.

With the supply apparatus in accordance with the invention, it is therefore particularly preferred for the blower wheels to be made jointly in a one-piece component. Generally, two blower wheels can also hereby be provided which are separated by a neck serving as a shaft; however, the two blower wheels are preferably separated from one another in the one-piece component by a common partition wall. Such a component is very simple to manufacture. Furthermore, it is easily supportable on a shaft. Finally, it is characterized by especially small space requirements, which can be of large importance in view of the very limited available space in a vehicle.

To obtain a supply apparatus in accordance with the invention to be installed as simply as possible into a vehicle, it is preferred for the auxiliary blower to be arranged together with the cold air source and the hot air source in a common housing. In particular a housing with a modular design is also understood by this in which a housing of the auxiliary blower is connected to a housing of the cold air source and of the hot air source. Such a spatial combination does not only have the advantage that only one part has to be installed on the installation of the supply apparatus in accordance with the invention into a motor vehicle, but furthermore that the making available of the electrical connections required when an electrical drive is used for the auxiliary blower is also greatly simplified since these can be combined with the electrical connections of the cold air source and of the hot air source.

The cold air source and the hot air source can generally be any desired device by means of which cold air and hot air can be made available separately, with it being preferred for the cold air source and the hot air source to have a main blower connected to an air inlet for air to be temperature controlled, a cooling device connected to the main blower via a supply passage, a cold air chamber which is connected to the cooling device is connected after it and leads to the first cold air outlet, a heating device connected to the cold air chamber and a hot air chamber which is connected to the heating device, is connected after it and leads to the first hot air outlet, with the cold air inlet or the hot air inlet of the auxiliary blower respectively being connected to the cold air chamber or hot air chamber respectively. The main blower and also the auxiliary blower are preferably electrically driven.

The cooling device can be any desired device by means of which air supplied to it can be cooled. For this purpose, in particular a conventional evaporator driven electrically or via a drive of the vehicle, for example a combustion engine, can be used.

Any kind of device can serve as the heating device, by means of which air supplied to it can be heated to a higher temperature. It can here be a heating which is operated electrically or by fuel independent of a drive device, in particular of a combustion engine, of the vehicle. However, preferably a heating core is used to which a liquid, for example a coolant, heated on the operation of the drive device of the vehicle, in particular of a combustion engine, can be supplied to heat an air flow passing through it or flowing past it. Since the total supplied air is first cooled and then partly heated again, the moisture content of the air made available is clearly reduced such that in particular a removal of moisture on fogged windows and a drying of the passenger compartment in wet weather can take place faster.

It is preferred, to support a uniform supply of the two regions with hot air, for the heating device and the auxiliary blower to be arranged directly adjoining one another such that a part flow of a hot air flow made available by the heating device can be sucked in transversely to the flow direction of the remaining hot air flow of the auxiliary blower. A uniform branching of the part flow thus results over a large part of a discharge surface of the heating device which largely prevents the occurrence of excessively hot or cold regions at the discharge surface.

A further subject of the invention is an air conditioning system for supplying a first region and a second region in a vehicle with temperature controlled air comprising a supply device in accordance with the invention and at least one metering and/or mixing device connected to the first cold air outlet and to the first hot air outlet via separate connection passages for the metering and/or mixing of hot air and cold air to make available temperature controlled air for the first region and at least one metering and/or mixing device connected to the second cold air outlet and to the second hot air outlet via separate connection passages for the metering and/or mixing of hot air and cold air to make available temperature controlled air for the second region. The metering and/or mixing devices can in particular be restrictor devices or valves, for example check valves or throttle valves, which are the same or different and can be adjustable in steps or continuously, with additional mixing elements being able to be provided behind the actual restrictor devices or valves by means of which cold air and hot air discharged from the restrictor devices or valves can be mixed. It is, however, also possible to guide the metered air flows simply into the passenger compartment, where they are mixed by normal vorticity. The first cold air part flow and hot air part flow and the second cold air part flow and hot air part flow can be separately metered, and optionally mixed, by means of the first and second metering and/or mixing devices such that temperature controlled air can be made available in a separately adjustable manner for the first and second regions in the vehicle.

In the method in accordance with the invention, it is preferred for the second cold air part flow transported with the help of the auxiliary blower and for the second hot air part flow transported with the help of the auxiliary blower each to be split into further cold air part flows or hot air part flows respectively and for a corresponding further cold air part flow and a corresponding further hot air part flow to be mixed to make available temperature controlled air for different zones in the second region. In the air conditioning system in accordance with the invention, it is preferred for this purpose for at least one connection passage for cold air, and a corresponding connection passage for hot air, in particular in each case for the second region, to be branched at least once and for respective metering/and or mixing devices to be arranged in or at the corresponding branches for cold air or hot air respectively. In this further development of the invention, the large advantage results that different zones can be supplied in the second region with respectively individually temperature controlled air flows, optionally of individual strength, without additional connection passages having to be led from the cold air source and hot air source or from the auxiliary blower into the second region. A strengthening of temperature controlled air flows for a plurality of zones in the second region can take place simply in particular with only one auxiliary blower.

It is particularly preferred for the connection passages connected to the second outlets each to branch into at least four branches of which two respectively supply an upper region and a lower region of a left hand vehicle side and another two respectively supply an upper region and a lower region of a right hand vehicle side. The foot room and the region lying above this can hereby be differently temperature controlled both on the right hand side of the vehicle and on the left hand side of the vehicle, which is also known as a "bi-level split". Despite this very flexible control possibility for temperature controlled air, only one auxiliary blower and one cold air source and hot air source is required by the use or arrangement of the auxiliary blower in accordance with the invention.

The second region is preferably the backseat region of the vehicle since the supply apparatus is preferably arranged in the front region due to the closeness to an internal combustion engine of the vehicle.

BRIEF DESCRIPTION OF THE DRAWINGS

The invention will now be further explained by way of example with reference to the drawings. There are shown:

FIG. 1 is a schematic partly sectional view through a section of a motor vehicle with an air conditioning system in accordance with a preferred embodiment of the invention; and FIG. 2 is a schematic plan view of the section of the motor vehicle with the air conditioning system in FIG. 1.

DESCRIPTION OF THE PREFERRED EMBODIMENT

In FIGS. 1 and 2, a vehicle air conditioning system in a motor vehicle shown only sectionally, has a supply apparatus 10 which is arranged in part on a transmission tunnel 12 in the front region of the motor vehicle. First front connection passages 14 and 14' for cold air and hot air respectively for the front region of the motor vehicle and two rear connection passages 15 and 15' for cold air and hot air respectively for a backseat area of the motor vehicle are connected to the supply apparatus 10, with the rear connection passages 15 and 15' leading from the supply apparatus 10 past a gear stick 16 on the transmission tunnel 12 into the backseat region.

The supply apparatus 10 has a housing 18 in which—only shown schematically in the Figures—there are arranged a main blower 20, an evaporator 22, a heating core 24 and an auxiliary blower 26.

The housing 18 has an air inlet 28, first cold air outlets and hot air outlets 30 and 30' and second cold air outlets and hot air outlets 32 and 32'.

An inner space of the housing 18 is divided into a suction tract 34 between the air inlet 28 and the evaporator 22, a cold air chamber 36, which is bounded by the evaporator 22 on the one side and by the auxiliary blower 26, the heating core 24 directly adjoining the auxiliary blower 26 in an airtight manner and a separator 38 extending from the heating core 24 to the housing 18, on the other side, and a hot air chamber 40 taking up the rest of the inner space.

The cold air chamber 36 opens into the first cold air outlet 30, the hot air chamber 40 into the first hot air outlet 30'.

The main blower 20 is arranged behind the air inlet 28 inside the suction tract 34 in the flow direction and transports air to the evaporator 33 through the air inlet 28.

The evaporator 22 serves for the cooling of the air supplied from the air blower 20 which is pressed through this into the cold air chamber 36 while being cooled. The evaporator 22 is driven—not shown in the Figures—in a conventional manner via a belt drive by a combustion engine of the motor vehicle.

The heating core 24 is arranged downstream of the evaporator 22 and serves for the heating of air discharged from the cold air chamber 36 through said heating core 24 into the hot air chamber 40. The heating core 24 is set up in a conventional manner and—not shown in the Figures—connected in a usual manner for this purpose to the cooling water circuit of the combustion engine of the motor vehicle.

The auxiliary blower 26 has an annular auxiliary blower housing 42, a blower wheel unit 48 arranged therein and a drive motor 54.

The walls of the auxiliary blower housing 42 are each bent convexly inwardly above and below the annular plane in the direction of a central plane of the auxiliary blower housing 42 while forming upper and lower housing terminations 48 and 48'.

A dividing wall 50 is further provided which runs on the inner side of the auxiliary blower housing 42, extends at half height and in the annular plane of the auxiliary blower housing 42 and extends less far into the interior of the ring in the radial direction than the upper and lower housing terminations 48 and 48' of the auxiliary blower housing 42.

Part of the auxiliary blower housing 42 forms a section of the housing 18 of the supply apparatus 10. The second cold air outlet 32 and the second hot air outlet 32' are formed in this section of the auxiliary blower housing 42 in each case above or below the dividing wall 50.

The blower wheel unit is supported concentrically in the auxiliary blower housing 42 on an output shaft (not shown in the Figures) of the electrical drive motor 54 which thus does not serve only for the drive of the blower wheel unit 44, but also for its support.

The blower wheel unit 48 is made in one piece and includes two blower wheels 52 and 52' which are arranged parallel to one another in the annular plane of the auxiliary blower housing 42 and are separated from one another by a common dividing wall 54.

The diameter of the blower wheels 52 and 52' is selected such that the convexly arched upper and lower housing terminations 48 and 48' of the auxiliary blower housing 42 engage over the upper side or the lower side respectively of the blower wheel unit 44 and only a small gap is present between the dividing wall 50 of the auxiliary blower housing 42 and the dividing wall 54 of the blower wheel unit 44. In this way, two auxiliary blower chambers 56 and 56' for cold air and hot air respectively, which open into the second cold air outlet 32 and the second hot air outlet 32', and which are substantially separated from one another, are formed by the dividing wall 50, by corresponding sections of the auxiliary blower housing 42 formed above and below the dividing wall 50 respectively and by the blower wheels 52 and 52' respectively.

The blower wheels 52 and 52' are furthermore formed such that they suck in air from their end face on rotation by the drive motor 46 and transport it into the corresponding auxiliary blower chambers 56 or 56' while increasing the pressure. The openings of the auxiliary blower housing 42 at the end face thus serve as cold air outlets and hot air outlets respectively for the auxiliary blower 26.

The transported air can then be discharged substantially separately through the corresponding outlets 32 and 32'.

The heating core 24 and the auxiliary blower 26 are arranged directly adjacent to one another in the flow direction approximately in one plane. Hot air emitted from the heating core 24 into the hot air chamber 40 can hereby be uniformly sucked off by the auxiliary blower 26 transversely to a discharge area or to a hot air discharge direction such that no regions of hotter or cooler air can form downstream of the heating core 24 in the hot air chamber 40 which could result in a different supply of the first hot air outlet 30' and of the second hot air outlet 32' with hot air.

An air flow in the cold air chamber 36 sweeping past above the heating core 24 can be partly guided to the heating core 24 by a deflection surface 57 which contacts the heating core 24 at its end disposed in the flow direction and projects obliquely upwardly from the heating core 24 against the flow direction, while a remaining air flow is guided in the direction of the auxiliary blower 26.

On the operation of the supply apparatus, air sucked through the air inlet 28 into the suction tract by the main blower 20 is pressed through the evaporator 22 into the cold air chamber 36 while being cooled, where the cold air flow created is split into three part flows of which one is led into the first cold air outlet 30, a second is led via the first blower wheel 52 through the chamber 56 of the auxiliary blower 26 to the second cold air outlet 32 and a third is led through the heating core 24.

The third part flow is heated in the heating core 24 and is split, after entering into the hot air chamber 40, into a first hot air part flow which is supplied to the first hot air outlet 30' and into a second hot air part flow which is transported via the blower wheel 52' through the chamber 56' of the auxiliary blower into the second hot air outlet 32'.

The front connection passages 14 and 14' for cold air and hot air respectively are connected to the first cold air outlet or hot air outlet 30 and 30' respectively. They merge, after a branching not shown in the Figures, into further separate front connection passages for cold air and hot air respectively into a front mixing and outlet passage 58, with a first metering apparatus being arranged at their end in the form of a continuously adjustable throttle valve 60 which is continually adjustable by means of an actuator not shown in the Figures between a hot air abutment position in which the front connection passage 14 is blocked for cold air and a cold air position in which the front connection passage 14' is blocked for hot air.

Metered cold air part flows and hot air part flows discharged from the front connection passages 14 and 14' are combined in the front mixing and outlet passage 58 while being mixed to form a temperature controlled air flow for a zone of the front region of the vehicle.

The further connection passages, which are not shown in the Figures and which branch off from the connection passages 14 and 14', likewise have continuously adjustable throttle valves which can be adjusted independently of the throttle valve 60 and serve for the feeding of other zones in the front region of the vehicle with temperature controlled air.

The rear connection passages 15 and 15' for cold air and hot air are connected to the second cold air outlet 32 and the second hot air outlet 32' of the auxiliary blower 26 respectively.

The cold air outlet and the hot air outlet 32 and 32' respectively of the auxiliary blower 26 are here aligned to the side with respect to a longitudinal direction of the transmission tunnel 12 such that the rear connection passages 15 and 15' curved at their end connected to the auxiliary blower 26 can be guided past the gear stick 16 on the transmission tunnel 12 into the backseat region of the motor vehicle.

The rear connection passages 15 and 15' each branch off downstream of the gear stick 16 into further rear connection passages for cold air and hot air of which only the connection passages 62 and 62' for cold air and hot air respectively and 64 for cold air are visible in the Figures. The further rear connection passages 62 and 62' as well as the further rear connection passage 64 and the further rear connection passage which corresponds to this and is not visible in the Figures open into rear mixing and discharge passages 66 and 68 which lead into different zones in the backseat region of the vehicle. At the end of the further rear connection passages 62 and 62' as well as of the further rear connection passage 64 and of the connection passage for hot air which corresponds to this and is not visible in the Figures, pivotable throttle flaps 70 and 72 respectively are each attached as second restrictor devices which can be continually adjusted by means of an actuator not shown in the Figures between a hot air abutment position in which the cold air section is blocked and a cold air position in which the hot air section is blocked.

As already described, there are formed from a cold air flow in the supply apparatus 10 a first cold air part flow and a second cold air part flow which are guided through the first cold air outlet 30 or, after a pressure increase in the auxiliary blower 26, through the second cold air outlet 32, into the connection passages 14 and 15 respectively, where they are split into further cold air part flows in corresponding branches of which only the branch of the rear connection passage 15 into the further rear connection passages 62 and 63 is shown in the Figures. Furthermore, there are formed from a hot air flow in the supply apparatus a first and a second hot air part flow which are guided through the first hot air outlet 30' or, after a pressure increase in the auxiliary blower 26, through the second hot air outlet 32', into the connection passages 14' and 15' respectively, where they are split into further hot air part flows in corresponding branches of which only the branch of the rear connection passage 15' is shown in the Figures.

Depending on the position of the throttle flaps 60 or 70 respectively and 72, the corresponding cold air part flows and hot air part flows are then mixed to form temperature controlled air flows which are then supplied to the corresponding zones in the front region or the backseat region of the vehicle.

A supply of the backseat region of the vehicle is achieved without pressure losses with only one pair of connection passages 15 and 15' by the arrangement of the auxiliary blower 26 in the supply apparatus 10 and the separate transport of cold air and hot air therein. It is moreover possible to ensure the supply with only two rear connection passages which are led past the gear stick 16 in a space saving manner.

What is claimed is:

1. A method of making available temperature controlled air for a first region and for a second region in a vehicle, in which a cold air flow and a hot air flow are generated by a primary blower;

at least one first cold air part flow and one first hot air part flow respectively are formed from the cold air flow and the hot air flow and the first cold air part flow and the first hot air part flow are mixed to form a first temperature controlled part flow for the first region; and at least one second cold air part flow and one second hot air part flow respectively are formed from the cold air flow and the hot air flow, the second cold air part flow and the second hot air part flow are transported separately by means of an auxiliary blower and are mixed to form a second temperature controlled part flow for the second region downstream of the auxiliary blower.

2. A method in accordance with claim 1, characterized in that the second cold air part flow transported with the help of the auxiliary blower and the second hot air part flow transported with the help of the auxiliary blower are each split into further cold air part flows and hot air part flows; and in that a corresponding further cold air part flow and a corresponding further hot air part flow are mixed to make available temperature controlled air for different zones in the second region.

3. A method in accordance with claim 1 or claim 2, characterized in that the second region is a backseat region of the vehicle.

4. A supply apparatus to make available cold air and hot air for a vehicle air conditioning plant comprising a cold air source and a hot air source by means of which a cold air flow and a hot air flow can be generated by a primary blower and which has a first cold air outlet for cold air to be made available and a first hot air outlet for hot air to be made available; and an auxiliary blower which has a cold air inlet connected to the cold air source and hot air source for the supply of cold air and a hot air inlet connected to the cold air source and hot air source for the supply of hot air as well as a second cold air outlet and a second hot air outlet and by means of which the air flows supplied to the inlets of the auxiliary blower can be separately supplied to the corresponding second outlets to discharge cold air or hot air respectively to be made available.

5. A supply apparatus in accordance with claim 4, characterized in that the auxiliary blower includes two blower wheels which are jointly driven by a drive apparatus.

6. A supply apparatus in accordance with claim 5, characterized in that the blower wheels are jointly formed in a one-piece component.

7. A supply apparatus in accordance with claim 4, characterized in that the auxiliary blower is arranged together with the cold air source and hot air source in a common housing.

8. A supply apparatus in accordance with 4, characterized in that the cold air source and hot air source has a main blower connected to an air inlet for air to be temperature controlled, has a cooling device connected to the main blower via a supply passage, has a cold air chamber connected to and after the cooling device and leading to the first cold air outlet, has a heating device connected to the cold air chamber, and has a hot air chamber connected to and after the heating device and leading to the first hot air outlet, wherein the cold air inlet and hot air inlet of the auxiliary blower are respectively connected to the cold air chamber and hot air chamber.

9. A supply apparatus in accordance with claim 7, characterized in that the heating device and the auxiliary blower are arranged directly adjacently to one another such that a part flow of a hot air flow made available by the heating device can be sucked in by the auxiliary blower transversely to the flow direction of the remaining hot air flow.

10. An air conditioning system for supplying a first region and a second region in a vehicle with temperature controlled air comprising a supply apparatus in accordance with claim 4;

at least one first metering and/or mixing device connected to the first cold air outlet and to the first hot air outlet via separate connection passages to meter and/or mix hot air and cold air to make available temperature controlled air for the first region; and at least one second metering and/or mixing device connected to the second cold air outlet and the second hot air outlet via separate connection passages to meter and/or mix hot air and cold air to make available temperature controlled air for the second region.

11. An air conditioning system in accordance with claim 10, characterized in that at least one connection passage for cold air and a corresponding connection passage for hot air, in particular for the second region in each case, branches at least once and metering and/or mixing devices respectively are arranged in or at the corresponding branches for cold air and hot air respectively.

12. An air conditioning system in accordance with claim 11, characterized in that the connection passages connected to the second outlets each branch into four branches of which two respectively supply an upper region and a lower region of a left hand vehicle side and two others respectively supply an upper region and a lower region of a right hand vehicle side.

13. An air conditioning system in accordance with claim 10, characterized in that the second region is a backseat region of the vehicle.

* * * * *